United States Patent

[11] 3,619,728

[72] Inventor Irving B. Cooper, Jr.
Marblehead, Mass.
[21] Appl. No. 869,788
[22] Filed Oct. 27, 1969
[45] Patented Nov. 9, 1971
[73] Assignee Notifier Company
Lincoln, Nebr.

[54] AUTHORIZATION TYPE OF CONTROL SYSTEM
20 Claims, 2 Drawing Figs.

[52] U.S. Cl. .................................................... 317/134, 307/40
[51] Int. Cl. .................................................... E05b 49/02
[50] Field of Search ........................................ 317/134; 307/40; 70/271, 278; 235/61.11; 340/149

[56] References Cited
UNITED STATES PATENTS
2,967,916 1/1961 Williams ..................... 340/149 X
3,508,031 4/1970 Cooper, Jr. .................. 235/61.11

*Primary Examiner*—J. D. Miller
*Assistant Examiner*—Harry E. Moose, Jr.
*Attorney*—Willis M. Ertman

ABSTRACT: An authorization type of control system includes a data sensor having a plurality of data sensing positions, first circuitry for generating an output signal as a function of data sensed by each of the data positions, second circuitry responsive to a request signal to actuate the first circuitry to sense each of the data positions, third circuitry for producing an authorization signal in response to output signals from the first circuitry indicating a predetermined data item at each of the data positions, and fourth circuitry responsive to an incorrect output signal from the first circuitry from any one of the data positions for preventing generation of the authorization signal by the third circuitry for a predetermined period of time after termination of the request signal.

AUTHORIZATION TYPE OF CONTROL SYSTEM

SUMMARY OF INVENTION

Figures 1, 2:
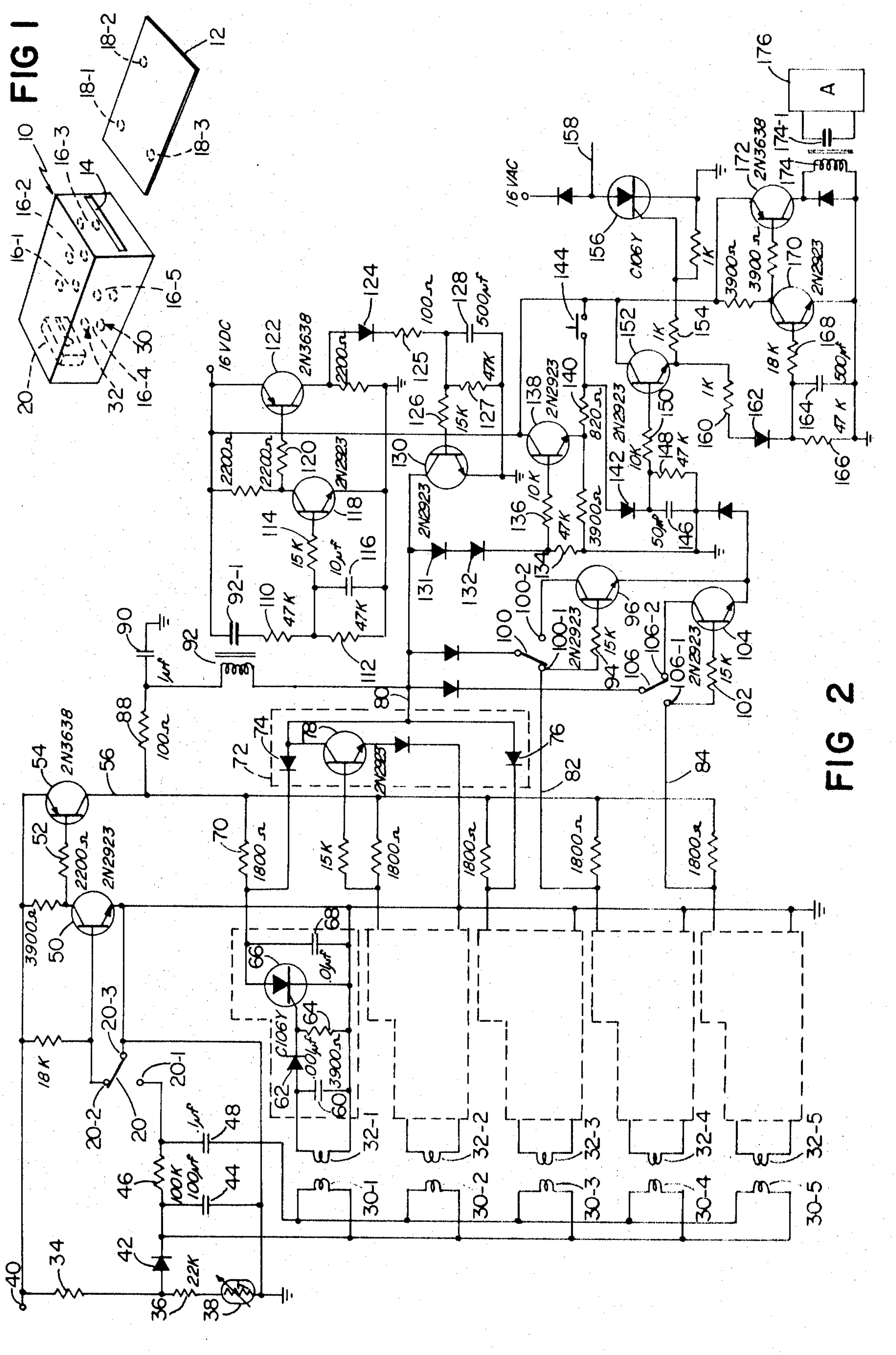

This invention relates to control systems of the type which provide an authorization signal in response to input data, and more particularly to the authorization type of control systems that are controlled by a card or similar type of device.

Control systems that authorize the use of equipment or material or provide grant access to controlled areas are well known. A particularly useful type of such control system employs a reader and a card having coded information stored thereon. Such card reader control systems are simple to operate and reliable and have found use in a variety of applications for controlling the access to security areas or the use of material. Such control systems are frequently used to control the use of economically valuable materials or access to security areas and for this reason attempts are made to compromise the system to improperly generate an authorization signal.

Accordingly, it is an object of this invention to provide a novel and improved authorization type of control system which provides a greater degree of security.

Another object of the invention is to provide a novel and improved authorization control system which, in response to attempted improper operation of the control system automatically renders itself inoperable for a predetermined period of time.

Another object of the invention is to provide a novel and improved authorization system of the type that employs a card reader which provides an indication of the presentation of an improper card of either metallic or nonmetallic material.

A further object of the invention is to provide a novel and improved control system for controlling access to a security area.

In accordance with the invention there is provided an authorization type of control system that includes a data sensor which has a plurality of data sensing positions. First circuitry is provided for generating an output signal as a function of the data sensed by each of the data positions. Second circuitry, responsive to a request signal, actuates the first circuitry to sense each of the data positions. Third circuitry is arranged to produce an authorization signal in response to an output signal from the first circuitry indicating a predetermined data item at each of the data positions, and fourth circuitry responsive to an incorrect output signal from the first circuitry from any one of the date positions prevents generation of the authorization signal and the third circuitry and provides an indication of the attempted improper operation of the system.

In a particular embodiment the data sensor is a card reader having a sensing area in which a plurality of data sensors are disposed in predetermined positions. A card cooperates with the card reader and is arranged for positioning in the sensing area. In response to a request signal, from a separate circuit which may respond to a pushbutton or insertion of the card in the sensing area, for example, the first circuitry energizes the data sensors to sense the data on the card. The third circuitry responds to each sensed data item on the card to and in response to a predetermined combination of data items produces an authorization signal. Should the card in the sensing area when the request signal is generated contain incorrect or no data items, the fourth circuit senses the generation of the incorrect data signal and operates circuitry which prevents generation of an authorization signal for a predetermined period of time.

In this embodiment, each data position includes a transformer that has spaced primary an secondary windings between which the card is interposed. The request signal is generated by a switch in the card sensing area, which switch gates a voltage for application to data storage elements connected to the secondary windings of the data sensor and also applies a voltage to a control relay. Logic circuits, including manually operable switches, select a logic configuration of outputs from the secondary windings of the data sensors and are arranged so that the control relay coil has a first signal applied to it in response to an improper code and a second signal applied to it in response to detection of a proper card. The third and fourth circuitries include as a common element a control relay coil which is energized in response to an incorrect data signal. The request signal is applied to the coil and, in response to a correct data signal, operates the third (authorization) circuitry which includes a controlled rectifier, and the fourth circuitry includes an electrical storage element (a capacitor) which maintains the relay coil energized for a predetermined length of time after termination of the request signal.

Other objects, features and advantages of the invention will be seen as the following description of a particular embodiment progresses in conjunction with the drawing in which:

FIG. 1 is a perspective view of a card reader and card employed in conjunction with a particular embodiment of the invention; and FIG. 2 is a schematic diagram of circuitry constructed in accordance with the invention.

DESCRIPTION OF PARTICULAR EMBODIMENT

The illustrated embodiment of the invention is used for supervising access to a security area. Output of the card reader 1 when a proper card is inserted in sensing area 14 releases a door lock. It will be obvious that the invention can be used in many other applications. In the illustrated embodiment the card reader is of the type disclosed in my copending application Ser. No. 481,687, filed Aug. 23, 1965 and entitled "Control System" now U.S. Pat. No. 3,508,031, and has five data sensing positions 16. The card 12 carries one or more electrically conductive elements 18. In the illustrated embodiment there are three such discs—18–1 which corresponds to sensor 16–1, 18–2 which corresponds to sensor 16–3 and 18–3 which corresponds to sensor 16–4. In addition there is in the rear of the sensing area a card sensor switch 20. Each element 18 may be a copper or aluminum disc of thickness in the order of 2 ½ mils. or less and the discs 18 are encased with opaque material so that their relative positions on the card are not visible to the card user.

At each sensing position in the card reader there is a sensor that includes a primary winding 30 and a cooperating juxtaposed secondary winding 32 on the opposite side of the sensing area. A pulse signal is applied to the primary winding 30 by the operation of switch 20 in response to the insertion of a card in the sensing area. The circuitry for applying this pulse signal to the primary windings 30, as indicated in FIG. 2, includes a network comprising resistors 34, 36 and thermistor 38 that is connected to a B+ terminal 40. A typical voltage applied to terminal 40 is twenty volts DC. This voltage is applied through the circuit including diode 42 and capacitor 44 to one terminal of each of the primary windings 30. This voltage is also applied through resistor 46 to contact 20–1 of switch 20. The series circuits of each primary winding 30 and capacitor 48 are connected across resistor 46 so that capacitor 48 is normally discharged. A second terminal 20–2 of the switch is connected to the base electrode of transistor 50 whose collector is connected via resistor 52 to the base electrode of transistor 54. The two transistors 50, 54 are connected to the B+ bus and operate to gate the B+ voltage to line 56. The common terminal 20–3 of the switch is grounded.

Each secondary winding 32 of the sensors has circuitry connected to it that includes capacitor 60, diode 62, resistor 64, silicon controlled rectifier 66, capacitor 68, and resistor 70. In addition, three of the secondary winding circuits are connected to a logic circuit 72 that includes diodes 74, 76 and transistor 78. A signal is generated on output line 80 in response to a signal from secondary winding 32–2 and no signals from secondary windings 32–1 and 32–3. A signal is generated on output line 82 in response to no signal from winding 32–4 and a signal is generated on output line 84 is response to no output from secondary winding 32–5.

The gated B+ signal on line 56 is applied to enable the controlled rectifiers 66 and through resistor 88 to relay coil 92 which controls normally open contacts 92–1. The output of the logic circuit is applied on line 80 to the other terminal of coil 92. The output of line 82 is applied through resistor 94 to the base of transistor 96 and to terminal 100–1 of manually operated switch 100. Similarly, the output on line 84 is applied through resistor 102 to the base of transistor 104 and also to terminal 106–1 of manual operated switch 106. Terminal 100–2 of switch 100 is connected to the collector of transistor 96 while terminal 106–2 is similarly connected to the collector of transistor 104. Each switch 100, 106, when connected to its first (−1) contact, applies a ground to coil 92 when its associated SCR 66–4, 66–5, respectively is conducting. Transistors 96 and 104 are effectively inverter transistors and will ground coil 92 when the corresponding switch 100, 106 is connected to its second (−2) terminal and its associated SCR 66 is not conducting. A ground potential is also applied to coil 92 over line 80 from logic circuit 72 unless SCRs 66–1 and 66–3 are not conducting and SCR 66–2 is conducting. Contacts 92–1 of relay 92, when closed, apply a switching potential through the input network of resistors 110, 112 and 114 and capacitor 116 to turn on transistor 118. The collector of transistor 118 is connected via resistor 120 to the base of transistor 122 and the collector of transistor 122 is in turn connected via diode 124 and an input network of resistors 125–127 and capacitor 128 to the base electrode of transistor 130. When transistor 130 is conducting, it holds a ground on coil 92 and the 500 microfarad capacitor 128 latches transistor in conducting condition for a minimum of 30 seconds.

Also connected to relay coil 92 via diodes 131, 132 and a network of resistors 134, 136 is an emitter follower switching transistor 138 whose emitter is connected via resistor 140 and diode 142 to the input network of 50 microfarad capacitor 146 and resistors 148, 150 of transistor 152. The emitter of transistor 152 is connected via resistor 154 to the control electrode of SCR 156 whose anode is connected via line 158 to the door lock circuit. The lock is released when SCR 156 is conducting (authorization) and that authorization signal terminates as soon as transistor 152 releases SCR 156. The emitter of transistor 152 is also connected via resistor 160, diode 162 and an input network of capacitor 164 and resistors 166 and 168 to the circuit of transistors 170 and 172. The collector of transistor 172 is connected to relay coil 174 which, when energized, closes contacts 174–1 to bypass the alarm circuit 176. Thus, when an authorization signal is applied on line 158, the alarm circuit is bypassed. The charge on capacitor 164 maintains this alarm bypass condition for about one half minute after termination of the lock release signal on line 158.

When card 12 is removed from sensing area 14, switch 20 returns to its initial state, releasing the conducting SCRs 66 and removing the B+ voltage from coil 92. The system is ready for another card unless the authorization signal has been blocked in which event a delay is imposed to allow capacitor 128 to discharge and release transistor 130.

When card 12 is inserted in sensing area 14, switch 20 will be operated to open contacts 20–2 and then close contacts 20–1. The opening of contacts 20–2 causes transistor 54 to conduct and apply the B+ voltage on line 56 to coil 92 via resistor 88 and to the SCRs 66 via resistors 70. The closing of contacts 20–1 applies by series resonant circuitry a high-frequency signal (a typical pulse width being one microsecond) to primary windings 30. If a disc 18 is interposed between windings 30 and 32 the resulting flux is absorbed by a shorted turn effect and the secondary winding does not produce a significant output. The winding 32 does produce an output if no disc 18 is interposed which output triggers the SCR 66 into conduction. Thus SCRs 66–2 and 66–5 will conduct in response to the sensing of card 12. With switches 100 and 106 set as indicated in FIG. 2 no ground will be applied to coil 92. Should switch 106 be in the same position as switch 100, however, a ground would be applied to coil 92 and current would flow to close contacts 92–1. In that event capacitor 116 is charged sufficiently to trigger transistors 118 and 122 and capacitor 128 is charged and holds transistor 130 in conducting condition for at least thirty seconds after contacts 92–1 open. Thus the authorization circuitry is immediately locked out if an incorrect card or other device actuates switch 20.

As no ground was applied to coil 92, however, the gated B+ signal is coupled through diodes 131, 132 and input network of resistors 134, 136 to turn on transistor 138 and an output signal is applied through resistor 140 and diode 142 to the input network of capacitor 146 and resistors 148, 150 to turn on transistor 152 and in turn SCR 156 to complete an authorization circuit to the door lock in the controlled area, unlocking the door and permitting access by the card holder. Also, the conduction of transistor 152 is coupled via resistor 160 and diode 162 and input network of capacitor 164 and resistors 166, 168 to cause transistors 170 and 172 to conduct and energize relay coil 174 which closes contacts 174–1 to bypass an alarm circuit which would be energized upon opening of the door. Operation of exit button 144 also bypasses the alarm circuit and completes the authorization circuit to allow a person to leave the security area.

Thus the circuit responds promptly to a properly coded card 12 inserted in the card reader 10 but latches out (the circuit output is rendered inoperable) for a predetermined period of time in response to each insertion of an improper card or other mechanism in attempting to compromise the security system. Logic in the card reader (sensors 16–1, 16–2 and 16–3) requires a predetermined configuration of security indicia on the card inserted in the card reader while the card reader further includes sensor positions (16–4 and 16–5) that may be selected and easily adjusted by movement of manual switches 100 and 106 to vary the card codes which are authorized. Any operation of the switch 20 by an unauthorized device (an unauthorized card, a metal blade, or a plastic strip for example) will latch the system for the predetermined period of time. Should switch 20 be again operated during this penalty period of time, by either an authorized or an unauthorized device, the penalty period will be automatically extended, making further attempts to compromise the system ineffective.

While a particular embodiment of the invention has been shown and described, various modifications thereof will be apparent to those skilled in the art and therefore it is not intended that the invention be limited to the disclosed embodiment or to details thereof, and departures may be made therefrom within the spirit and scope of the invention as defined in the claims.

What is claimed is:

1. An authorization type of control system comprising a data sensor having a plurality of data sensing positions, first circuitry for generating an output signal as a function of data sensed by each of said data positions, second circuitry responsive to a request signal to actuate said first circuitry to sense each of said data positions, third circuitry for producing an authorization signal in response to output signals from said first circuitry indicating a predetermined data item at each of said data positions, and fourth circuitry responsive to an incorrect output signal from said first circuitry from any one of said data positions for preventing generation of said authorization signal by said third circuitry for a predetermined period of time after termination of said request signal.

2. The system as claimed in claim 1 and further including a relay, means responsive to an authorization request for applying an enabling voltage to said relay and wherein said fourth circuitry includes means for completing a circuit to operatively energize said relay, and means for maintaining said relay operatively energized for said predetermined period of time after termination of said authorization request.

3. An authorization type of control system comprising a data sensor having a plurality of data sensing positions, first circuitry for generating an output signal as a function of data sensed by each of said data positions, second circuitry responsive to a request signal to actuate said first circuitry to sense each of said data positions, third circuitry for producing an authorization signal in response to output signals from said first circuitry indicating a predetermined data item at each of said data positions, and fourth circuitry responsive to an incorrect output signal from said first circuitry from any one of said data positions for preventing generation of said authorization signal by said third circuitry for a predetermined period of time after termination of said request signal, said fourth circuitry including a capacitor, means responsive to a predetermined charge on said capacitor for preventing generation of said authorization signal and means responsive to an incorrect output signal from said first circuitry for modifying the charge on said capacitor.

4. The system as claimed in claim 3 wherein said capacitor charge modifying means includes a relay having a coil connected to said third circuitry, a set of contacts controlled by said coil and circuitry connected between said set of contacts and said capacitor for placing said predetermined charge on said capacitor.

5. The system as claimed in claim 4 wherein said third circuitry includes circuitry connected to said coil for generating said authorization signal when said coil is placed in a first operative state in response to signals from said first circuitry, and said fourth circuitry includes circuitry connected to said coil for inhibiting generation of said authorization signal when said coil is placed in a second operative state in response to signals from said first circuitry.

6. The system as claimed in claim 1 wherein said data sensor is a card reader having a sensing area for receiving a card and a data sensor is disposed at each of said data sensing positions adjacent said sensing area.

7. The system as claimed in claim 6 and further including means responsive to disposition of a card in said sensing area for generating said request signal.

8. The system as claimed in claim 7 wherein said means for generating said request signal includes a card responsive switch and circuitry including a capacitor connected to said switch to generate a signal for actuating all of said data sensors.

9. The system as claimed in claim 6 and further including a data storage element corresponding to each data sensor, means responsive to disposition of a card in said sensing area for applying an enabling signal to each said data storage element, and circuitry coupled between each said data sensor and the corresponding data storage element for changing the condition of said data storage elements as a function of the data sensed by each of said data sensors.

10. The system as claimed in claim 6 wherein each said data sensor includes a primary winding and a secondary winding and said second circuitry includes means for applying an energizing signal to each said primary winding to induce signals in the corresponding secondary windings as a function of data encoded on said card.

11. The system as claimed in claim 1 wherein said fourth circuitry includes logic for combining signals from a plurality of data sensing positions for preventing generation of said authorization signal.

12. The system as claimed in claim 11 wherein said logic includes at least one manually operable switch.

13. The system as claimed in claim 12 wherein said data sensor is a card reader having a sensing area for receiving a card and a data sensor is disposed at each of said data sensing positions adjacent said sensing area, each said data sensor including a primary winding and a secondary winding, said second circuitry includes means for applying an energizing signal to each said primary winding to induce signals in the corresponding secondary windings as a function of data encoded on said card, and further including means responsive to disposition of a card in said sensing area for generating said request signal, including a card responsive switch and circuitry including a capacitor connected to said switch to generate a signal for actuating all of said data sensors.

14. The system as claimed in claim 13 and further including a data storage element corresponding to each data sensor, means responsive to disposition of a card in said sensing area for applying an enabling signal to each said data storage element, and circuitry coupled between each said data sensor and the corresponding data storage element for changing the condition of said data storage elements as a function of the data sensed by each of said data sensors.

15. The system as claimed in claim 14 and further including a relay, means responsive to an authorization request for applying an enabling voltage to said relay, and wherein said fourth circuitry includes means for completing a circuit to operatively energize said relay, and means for maintaining said relay operatively energized for said predetermined period of time after termination of said authorization request.

16. An authorization type of control system comprising a card reader having a sensing area for receiving a card and a plurality of data sensors disposed adjacent said sensing area, each said data sensor including a primary winding and a secondary winding, means including a card responsive switch for generating a request signal in response to disposition of a card in said sensing area, circuitry including a capacitor connected to said card responsive switch for applying an energizing signal to each said primary winding to induce signals in the corresponding secondary windings as a function of data encoded on said card, a data storage element corresponding to each data sensor, means for applying an enabling signal to each said data storage element in response to disposition of a card in said sensing area, circuitry coupled between each said data sensor secondary winding and the corresponding data storage element for changing the condition of said data storage elements as a function of the data sensed by each of said data sensors, a relay, circuitry for producing an authorization signal in response to output signals from said data storage elements indicating a predetermined data item at each of said data positions including means responsive to an authorization request for applying an enabling voltage to said relay, and circuitry responsive to an incorrect output signal from any one of said data storage elements for preventing generation of said authorization signal for a predetermined period of time after termination of said request signal, said last named circuitry including logic means including at least one manually operable switch for combining signals from a plurality of data storage elements for completing a circuit to operatively energize said relay, for preventing generation of said authorization signal, a capacitor, means responsive to a predetermined charge on said capacitor for maintaining said relay operatively energized for said predetermined period of time after termination of said authorization request, and means responsive to an output signal from said logic means for modifying the charge on said capacitor.

17. The system as claimed in claim 16 wherein said capacitor charge modifying means includes a relay having a coil connected to said third circuitry, a set of contacts controlled by said coil, and circuitry connected between said set of contacts and said capacitor for placing said predetermined charge on said capacitor.

18. The system as claimed in claim 17 wherein said third circuitry includes circuitry connected to said coil for generating said authorization signal when said coil is placed in a first operative state in response to signals from said first circuitry, and said fourth circuitry includes circuitry connected to said coil for inhibiting generation of said authorization signal when said coil is placed in a second operative state in response to signals from said first circuitry.

19. The system as claimed in claim 11 wherein a plurality of said data sensing positions in said data sensor are aligned and said logic includes means for combining signals from said plurality of aligned data positions.

20. The system as claimed in claim 1 wherein said fourth circuitry includes means responsive to an attempt to generate a request signal during said predetermined period of time to extend said predetermined period of time.

* * * * *